May 16, 1950 S. I. DAVITCHO 2,507,963
JUICE EXTRACTOR FOR SQUEEZING THE JUICE FROM
LEMONS, ORANGES, AND OTHER FRUITS
Filed Sept. 6, 1946

INVENTOR
SAMUEL I DAVITCHO
BY
ATTORNEY

Patented May 16, 1950

2,507,963

UNITED STATES PATENT OFFICE 2,507,963

JUICE EXTRACTOR FOR SQUEEZING THE JUICE FROM LEMONS, ORANGES, AND OTHER FRUITS

Samuel I. Davitcho, Montreal, Quebec, Canada

Application September 6, 1946, Serial No. 695,162

1 Claim. (Cl. 146—3)

The invention relates to a juice extractor and particularly to a juicer for oranges and lemons.

The customary juice extracting devices consist of an upper cap-shaped pressure element and a conical bottom member. The extraction of the juice is effected by pressing the squeezing cap downward onto the bottom cone; the latter is frequently fitted with outwardly projecting ribs and located in a juice collecting vessel which is provided with a sieve. The fruit is squeezed between the cap and the conical bottom member and the extracted juice flows through the holes of the sieve to be collected in the storing vessel.

These customary juicers have two main disadvantages.

They require an excessive squeezing force and have nevertheless a surprising inefficiency; consequently a considerable portion of the juice remains in the fruit and is accordingly wasted. The poor efficiency of these juicers is particularly noticeable in households where often persons lacking in strength, for instance children perform the juice extraction from the fruits.

In order to eliminate these drawbacks juicers have been provided with means to subject the fruit between an upper and a bottom squeezer to rotative frictional pressure.

It is the object of this invention to improve squeezers of this rotational type and, particularly, to impart an oppositely directed rotative motion to both squeezer elements.

Figure 1:
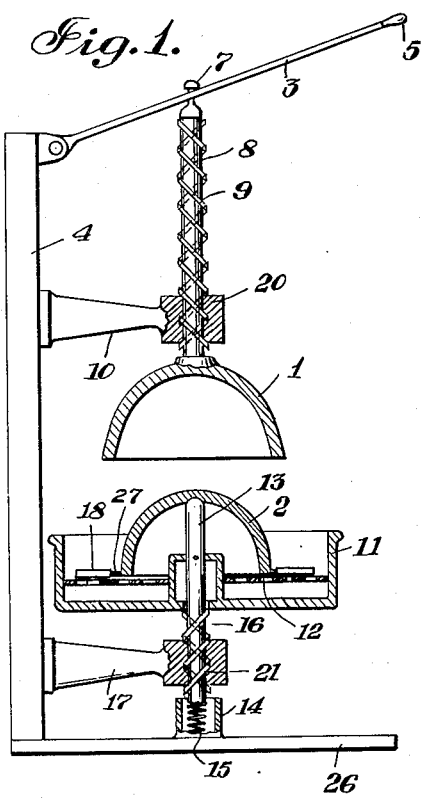
Figure 2:
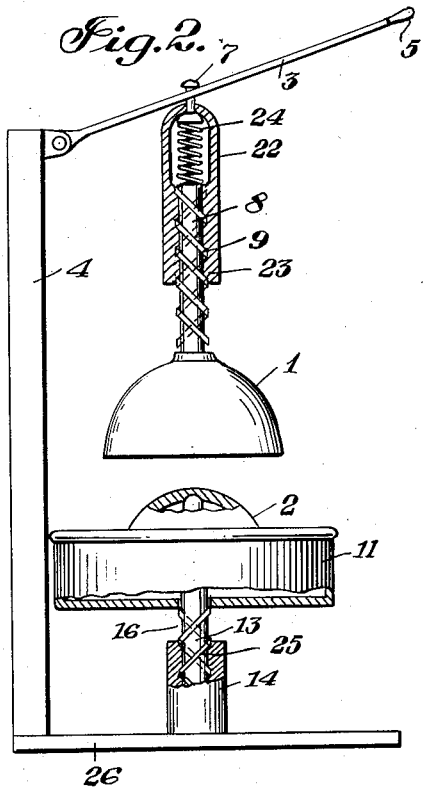
Figure 3:
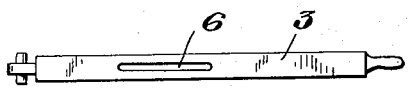

Accordingly the invention is embodied in a fruit juice extractor arranged and constructed as thereafter set forth and as illustrated in the accompanying drawing, in which Fig. 1 is a vertical sectional elevation of its one exemplification, Fig. 2 is a part vertical sectional elevation and part side view of a second exemplification, and Fig. 3 is a top view of a swingable lever which holds with the upper squeezing cap.

Referring now to Fig. 1, the juice extractor illustrated therein consists of an upper squeezing cap 1 and a bottom cone 2, which may be provided with external ribs.

The pressure cap 1 is moved up and down by a swingable lever 3. This lever is rotatably fastened to a stand or post 4 which is supported on base plate 26; this plate and the post 4 form the supporting structure for the juicer.

Lever 3 is provided with a handle 5; a slot 6 is provided in the lever and the upper end 7 of the cap holding rod 8 is held and guided by this slot. Rod 8 is provided with an outer screw thread 9; a corresponding inner screw thread 20 is applied to the head of arm 10 which latter is also secured to post 4. The two threads are in direct meshing cooperation.

Bottom cone 2 is supported on a rod 13, which extends into a bearing 14, the latter being mounted on base plate 26 which carries post 4. A sieve 12 is located in the juice collecting vessel 11 attached to post 4. Rod 13 is by means of spring 15 resiliently supported in bearing 14.

Rod 13 is provided with a circumferential screw thread 16 and a cooperating inner screw thread 21 is provided in the head portion of arm 17, which is also fastened to stand 4. Screw thread 9 of rod 8 and screw thread 16 of rod 13 are oppositely directed relative to each other.

On top of sieve 12 two cylindrical rollers are provided which are rotatable on pins 27; the pins are rigidly connected, for instance welded to bottom cone 2; if the cone rotates the rollers are rotated due to the frictional contact with the surface of the sieve. The dispersion of cellulose particles is greatly increased by the operation of these rollers and the transition of the juice through the sieve perforations is facilitated.

By the above described cooperation of the screw threads 9, 20 the squeezing cap 1 is set into a short rotation when the cap is moved downward by the swingable lever 3; as soon as a sufficient frictional contact is reached between cap 1 and cone 2 due to compression of the fruit therebetween the cone is rotated by screw threads 16, 21 in an opposite direction to the rotation of squeezing cap 1.

The very efficient operation of the juicer is evident.

The upper portion of the fruit held in cap 1 and the lower portion thereof located on base cone 2 are rubbed and ground against each other in a manner which is similar to that when a lemon is rubbingly squeezed by hand; the fruit juice is therefore completely extracted.

It is obvious that the instant juicer works fully satisfactory if the bottom cone is stationary and the juice extraction is solely effected by the short rotation of squeezing cap 1 on cone 2.

However, by the simultaneous rotation of the bottom cone in an opposite sense to that of the cap, the dejuicing time may be still further reduced; moreover, the dispersion of the fruit cellulose is improved in this manner and the operation of the juicer altogether facilitated.

The rollers 18 which are carried by cone 2 in frictional contact with sieve 12 effect a quick and efficient passage of the juice and the cellulose dispersion through the sieve perforations into vessel 11.

The bottom cone is returned into its initial position by spring 15, which has been compressed during the dejuicing operation.

The second embodiment of the invention illustrated in Fig. 2 is based on the same conception of rotating the pressure cap 1 or oppositely rotating both the cap 1 and the bottom cone 2.

In deviation from Fig. 1 arms 10 and 17 are here omitted; arm 10 is replaced by a tube 22; this tube is along slot 6 displaceably suspended in lever 3; it accommodates rod 8 which is rotatable by means of outer screw thread 9 of rod 8 and inner screw thread 23 of tube 22; a compression spring 24 is located between rod 8 and the upper closed end of tube 22.

The operation of this modification of the invention is similar to that of Fig. 1.

The invention is shown in two modifications only, but it is obvious that other changes in details and arrangement of parts may be resorted to without departing from the spirit and scope of the invention, as defined in the following claim.

I claim:

A juice extractor comprising a supporting structure, a juice collecting vessel carried by said structure, a bottom cone in said vessel, an upper squeezing cap carried by said supporting structure for pressure coaction with said cone, a rod holding said cap, a screw thread at the circumference of said rod, an arm carried by said supporting structure, an internal screw thread in said arm to coact with the outer screw thread of said rod, a second rod resiliently carried on said supporting structure to rotatably support said cone within said juice collecting vessel, a screw thread at the circumference of said rod, a second arm carried by said structure, an internal screw thread in said second arm to coact with the outer screw thread of said second rod, said screw thread being oppositely directed to the screw thread of said first rod, means to move said cap holding rod in a downward direction towards said cone and to rotate said cap and said cone upon establishment of frictional pressure contact in opposite direction, a sieve mounted in said juice collecting vessel and rollers carried by said cone in frictional contact with the upper surface of said sieve.

SAMUEL I. DAVITCHO.

REFERENCES CITED

The following references are of record in the file of this patent:

UNITED STATES PATENTS

| Number | Name | Date |
|---|---|---|
| 888,620 | Kissel | May 26, 1908 |
| 1,266,030 | Lins | May 14, 1918 |
| 1,762,855 | Deleray | June 10, 1930 |
| 1,771,503 | Merzoian | July 29, 1930 |
| 1,923,712 | Deitz | Aug. 22, 1933 |
| 1,969,006 | Herman | Aug. 7, 1934 |
| 2,109,653 | Seurlock | Mar. 1, 1938 |

FOREIGN PATENTS

| Number | Country | Date |
|---|---|---|
| 295,395 | Italy | Apr. 20, 1932 |